E. L. AND L. A. ANDERSON.
SOFT COLLAR HOLDER.
APPLICATION FILED SEPT. 7, 1920.
1,357,669.
Patented Nov. 2, 1920.
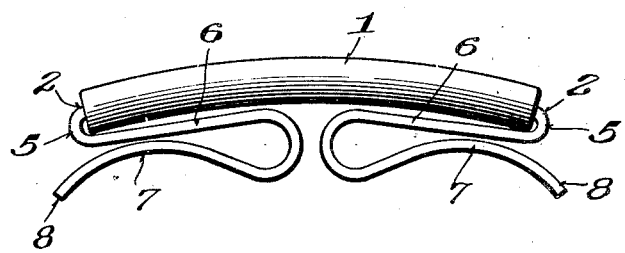
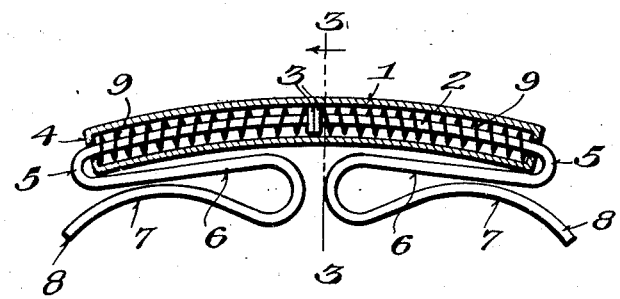
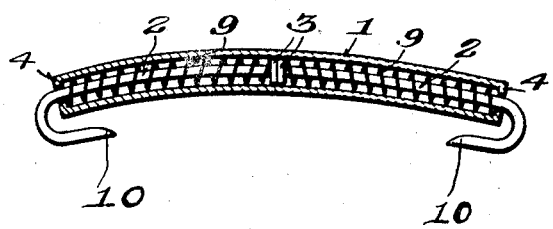
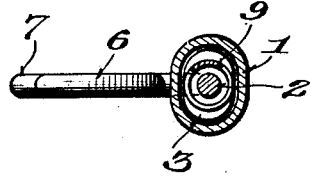
Inventor
Edward L. Anderson
Louis A. Anderson
By Joseph A. Miller
Attorney

UNITED STATES PATENT OFFICE.

EDWARD L. ANDERSON AND LOUIS A. ANDERSON, OF ATTLEBORO, MASSACHUSETTS, ASSIGNORS TO R. & G. COMPANY, OF ATTLEBORO, MASSACHUSETTS.

SOFT-COLLAR HOLDER.

1,357,669.   Specification of Letters Patent.   Patented Nov. 2, 1920.

Application filed September 7, 1920. Serial No. 408,510.

*To all whom it may concern:*

Be it known that we, EDWARD L. ANDERSON and LOUIS A. ANDERSON, citizens of the United States, residing at Attleboro, in the county of Bristol and State of Massachusetts, have invented new and useful Improvements in Soft-Collar Holders, of which the following is a specification.

This invention relates to certain new and useful improvements in soft collar holders, and the primary object thereof is to provide a soft collar holder wherein the collar ends are subjected to constant tension in a direction toward one another, and to this end the invention resides in the provision of a central bar which incloses a pair of collar end engaging devices the latter being subjected to spring tension so as to always have a tendency to approach one another.

The invention further aims to provide improved means for tensioning the collar end engaging devices, and to provide a holder which is positive and certain in operation and which can be easily removed and applied.

Further and other objects will be later set forth and manifested in the course of the following description.

In the drawings:

Figure 1, is a top plan view of the invention;

Fig. 2, is a central longitudinal sectional view;

Fig. 3, is an enlarged section on line 3—3 of Fig. 2; and

Fig. 4, is a view similar to Fig. 2, of a modified form of the invention.

In proceeding in accordance with the present invention, a tubular front bar 1, is employed, the ends of which are turned inwardly at 4, and slidably receives therein a pair of stems 2, having heads 3, on their inner ends. The heads normally abut and thereby restrict inward movement of the stems under the influence of the two coil springs 4, which latter encircle the stems or shanks and are interposed between the inturned bar ends and the heads 3, as depicted in Fig. 2, of the drawings. The stems or shanks having their outer ends curved outwardly at 5, providing abutments, which will also limit the inward movement of the stems, and are then bent to form outer parts 6, which extend longitudinally of the front bar and which parts provide rigid abutments or jaws for engaging the collar ends as will be now described. The parts 6, are curved outwardly and then inwardly to form spring jaws 7, which latter are extended outwardly at 8 to extend beyond the abutments 5, to facilitate engagement of the collar ends between the jaws 6 and 7. Upon introduction of the collar ends it will be apparent that the resilient or spring jaws 7, will press the collar ends against the rigid or stationary abutments or jaws 6, to thus firmly hold the same.

In the form of the invention depicted in Fig. 4, the structure is identical with that above described excepting as to the stems 2, which are curved downwardly and inwardly to form pins or hooks 10. In this form of the invention the hooks are forced into the collar ends at the desired points.

In both forms of the invention it will be seen that constant tension will be exerted on the jaws or pins so as to always cause the collar ends to have an approaching tendency thereby to hold same in fixed position.

By reference to Fig. 1, it will be seen that the bar 1, has a non-circular cross section, being somewhat elliptical and that the heads 3, have a corresponding form so as to prevent rotation of the stems relative to the front bar.

Having thus described our invention, what we claim as new and desire to secure by Letters Patent is:—

A soft collar holder including a tubular front bar having its ends turned inwardly, a pair of stems slidable in the bar and having heads on their inner ends, coil springs surrounding the stems and interposed between the heads and the inturned bar ends, said stems being curved outwardly and then inwardly to form fixed jaws and being then curved outwardly to form spring jaws which oppose the fixed jaws.

In testimony whereof we have signed our names to this specification in the presence of two subscribing witnesses.

EDWARD L. ANDERSON.
LOUIS A. ANDERSON.

Witnesses:
JAMES HILL,
JOSEPH A. MILLER.